United States Patent [19]

Staerzl

[11] 4,413,248
[45] Nov. 1, 1983

[54] LOW FUEL PRESSURE MONITOR FOR INTERNAL COMBUSTION ENGINE

[75] Inventor: Richard E. Staerzl, Fond du Lac, Wis.

[73] Assignee: Brunswick Corporation, Fond du Lac, Wis.

[21] Appl. No.: 221,625

[22] Filed: Dec. 31, 1980

[51] Int. Cl.³ ............................................. B60Q 1/00
[52] U.S. Cl. .................................. 340/52 R; 340/60; 340/62; 340/52 F; 340/626; 340/522
[58] Field of Search .................... 340/52 R, 52 F, 60, 340/62, 522, 626, 670, 692; 123/196 S, 196 R

[56] References Cited

U.S. PATENT DOCUMENTS

| | | | |
|---|---|---|---|
| 3,221,317 | 11/1965 | Ferrigno, Jr. | 340/692 X |
| 3,253,256 | 5/1966 | Hull | 340/60 X |
| 3,371,330 | 2/1968 | Howard et al. | 340/52 R X |
| 3,859,629 | 1/1975 | Komiyama et al. | 340/670 X |
| 3,893,108 | 7/1975 | McBride, Jr. et al. | 340/60 X |
| 4,021,794 | 5/1977 | Carlson | 340/60 X |
| 4,059,087 | 11/1977 | Tanigami et al. | 340/626 X |
| 4,261,209 | 4/1981 | Hatsuno et al. | 340/60 X |
| 4,261,305 | 4/1981 | Ikoma | 123/196 R X |

Primary Examiner—David L. Trafton
Assistant Examiner—Joseph Nowicki
Attorney, Agent, or Firm—Andrus, Sceales, Starke & Sawall

[57] ABSTRACT

A low fuel pressure monitor (25) for a two cycle engine (12) having an operating piston (21) initially cooled by pressurized fuel senses the fuel pressure at an output (18) of a fuel pump (14) and the operating speed of the engine (12) as sensed at an output (30) of an alternator (24) to provide an alarm (31) in response to a sensed low fuel pressure condition existing for a predetermined period of time while the engine (12) is operating above a predetermined speed. A circuit (99) senses an improper polarity connection of a battery (96) to provide a second type of an alarm.

3 Claims, 3 Drawing Figures 4,413,248

LOW FUEL PRESSURE MONITOR FOR INTERNAL COMBUSTION ENGINE

DESCRIPTION

Technical Field

This invention relates to a low fuel pressure monitor for a two cycle engine.

Background Art

Power generating systems which feature a two cycle internal combustion engine have been operated to respond to the sensed pressure within a crank case to operate a fuel pump to conduct fuel under pressure from a fuel tank to a combustion chamber. Such pressurized fuel is introduced into the combustion chamber to initially cool an operating piston before it is ignited to supply operating power. A decrease in fuel pressure can cause over heating to the operating piston, particularly when the engine operates at high speeds.

Disclosure of Invention

A low fuel pressure monitor for a two cycle engine having an operating piston initially cooled by pressurized fuel senses the fuel pressure supplied to the engine to provide a signal in response to a decrease in fuel pressure. The monitor provides an engine speed sensor and a timer to sense a low fuel pressure condition for a predetermined time to provide a warning when a low fuel pressure condition exists for a predetermined period of time while the engine is operating above a predetermined speed. The monitor senses an improper reverse polarity connection of a battery to sound a second type of an alarm.

BRIEF DESCRIPTION OF THE DRAWINGS

FIG. 3 is an electrical circuit schematic showing a modified circuit embodiment of a portion of the monitor of FIG. 2.

BEST MODES FOR CARRYING OUT THE INVENTION

Figure 1:
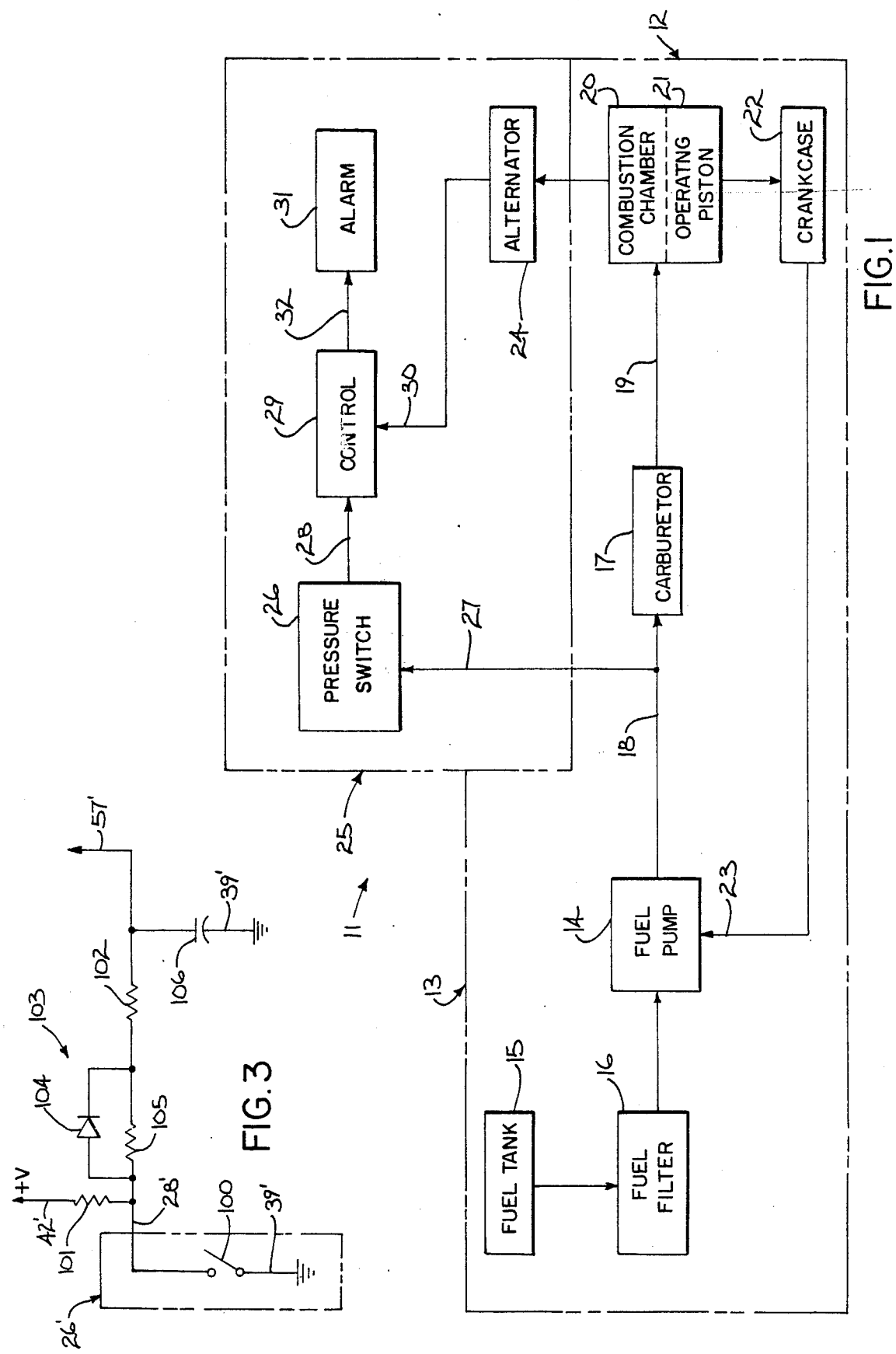
FIG. 1 is a block diagramatic illustration of a low fuel pressure monitor within a power system including a fuel supply connected to operate a two cycle internal combustion engine.

A power system 11, such as in a boat for example, utilizes a two cycle internal combustion engine 12 which selectively receives pressurized fuel from a fuel system 13 to provide output power to operate the power system 11 at a desired speed. The engine 12 and the fuel supply 13 may consist of any suitable system and the embodiment disclosed in the drawings is for illustrative purposes only.

A fuel pump 14 operates in a conventional manner and receives fuel from a fuel tank 15 through a fuel filter 16. A carburetor 17 operates in a conventional manner to receive pressurized fuel through a conduit 18 to provide a suitable air-fuel mixture through a conduit 19 to a combustion chamber 20 provided by the two cycle engine 12. The engine 12 may consist of a conventional two cycle motor frequently found in outboard engines used for boats or the like wherein the air-fuel mixture supplied to chamber 20 is utilized to initially cool an operating piston 21 in chamber 20 so as to establish a safe operating piston temperature before the fuel is ignited to provide a driving output (not shown) to operate a boat propeller or other suitable drive. The pressure at a crank case 22 of engine 12 may be sensed to provide an input 23 to the fuel pump 14 to provide a timed control for the supply of pressurized fuel from pump 14 to the combustion chamber 20.

A low fuel pressure monitor 25 is connected to the engine 12 and the fuel supply system 13 to sense a drop in the fuel pressure for a predetermined period of time while the engine 12 is operated above a predetermined speed. The output of engine 12 is connected in a conventional manner to operate an alternator 24 to generate electrical power for the power system 11, such as disclosed in the co-pending U.S. Patent Application Ser. No. 059,054 filed on July 19, 1979 by Richard Elmer Staerzl and entitled Energy Regulating System, U.S. Pat. No. 4,320,335 dated Mar. 16, 1982. A pressure switch 26 senses the pressure at the connecting conduit 18 through a sensing conduit 27 and provides an electrical output 28 which is connected to a control 29. An input 30 of control 29 supplies a series of pulses 8 from an output winding (not shown) of the alternator 29 with a frequency proportional to the operating speed of engine 12. An alarm 31 receives an output 32 from control 29 and provides an intermittent alarm signal when the fuel pressure at conduit 18 decreases below a predetermined magnitude for a predetermined period of time when the engine 12 is operating above a predetermined speed. The alarm 31 also provides a continuous signal if an energizing battery is improperly connected with reverse polarity.

The series of pulses 8 supplied from the output winding of alternator 24 are connected to an input 35 of a NOR gate 36 through serially connected resistors 37 and 38. The input 35 is also coupled to the system neutral 39 through a noise filtering capacitor 40. The series of pulses supplied through circuit 30 by the alternator 24 are rectified by a rectifying circuit 41 to provide a substantially constant D.C. voltage level "+V" at a connecting circuit 42. Specifically, an anode circuit of a diode 43 is connected to resistor 37 and to the system common 39 through a filtering capacitor 44. A cathode circuit of diode 43 is connected to the connecting circuit 42 and to the system common 39 through a parallel connected circuit including a Zener diode 45 and a capacitor 46.

Figure 2:
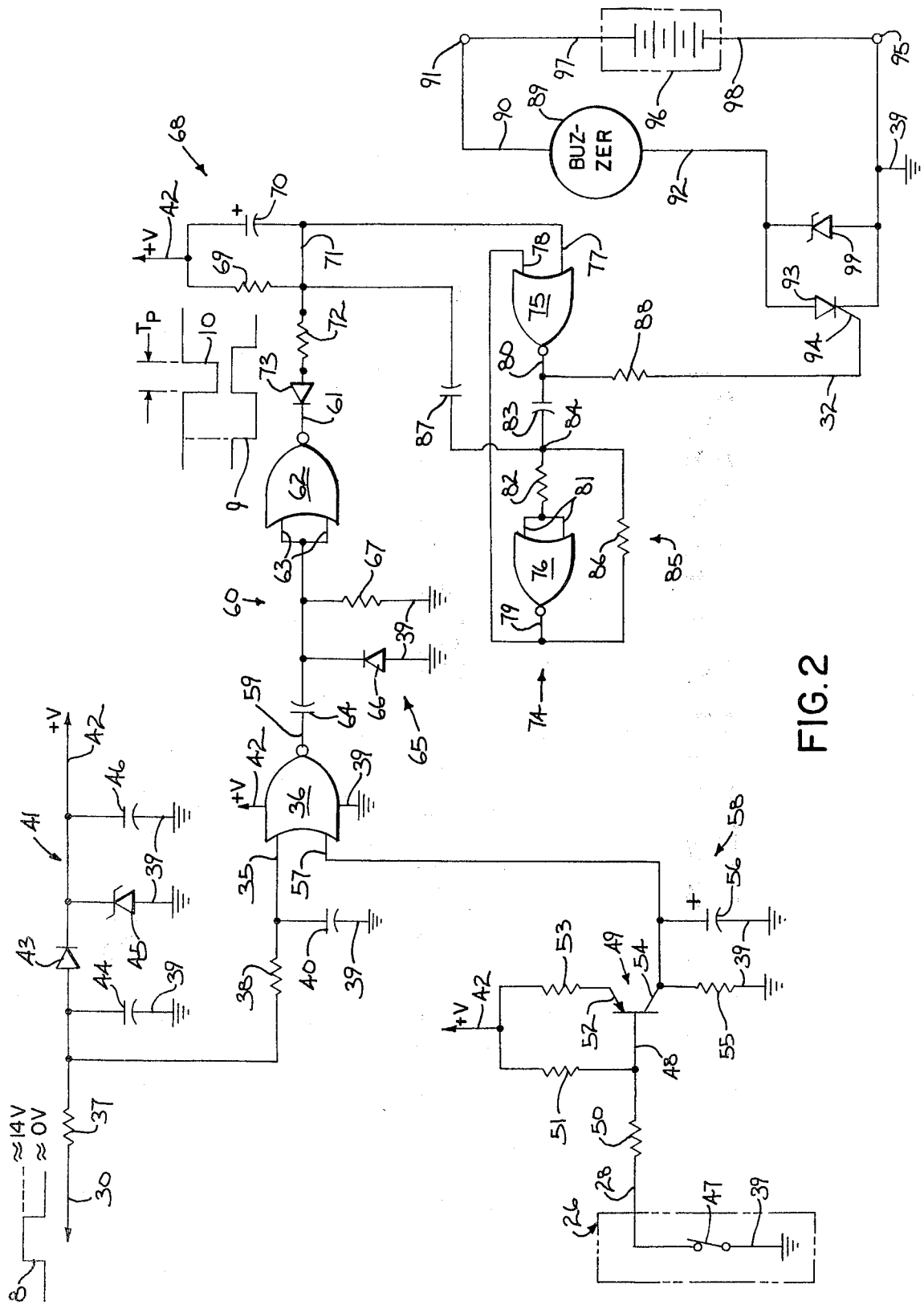
FIG. 2 is an electrical circuit schematic illustrating the low fuel pressure monitor of FIG. 1.

The pressure switch 26 is diagramatically illustrated in FIG. 2 as a normally closed switch 47 which opens upon sensing a pressure condition below a predetermined magnitude. A base circuit 48 of a PNP type transistor 49 is connected to the pressure switch circuit 28 through a connecting resistor 50 and is also connected to the constant potential lead 42 through a resistor 51. An emitter circuit 52 of transistor 49 is connected to the constant potential lead 42 through a resistor 53 while a collector circuit 54 is connected to the system common 39 through a parallel connected timing circuit 58 including a resistor 55 and a capacitor 56. The collector 54 is also connected to an input 57 of the NOR gate 36.

When the fuel pressure supplied through conduit 18 by fuel pump 14 is at or above a predetermined magnitude, the switch 47 remains closed to maintain the transistor 49 in a conducting condition. The capacitor 56 remains fully charged to maintain a high potential disable signal (hereafter referred to as logic "1") at input 57 to thereby maintain a low voltage signal (hereafter referred to as logic "0") at an output 59 of NOR gate 36.

When the fuel pressure through conduit 18 drops below the predetermined magnitude, switch 47 opens to turn off transistor 49. With transistor 49 non-conductive, capacitor 56 discharges through resistor 55 to lower the voltage potential at input 57 of NOR gate 36. After a predetermined time delay, such as five to eight seconds for example, the capacitor 56 discharges to a low voltage level to apply a logic "0" enable signal to input 57 of NOR gate 36.

The operation of engine 12 continuously supplies the series of pulses 8 at the output 30 of alternator 24 which have a frequency proportional to the operating speed of engine 12. With transistor 49 conducting in response to a sensed high pressure condition at conduit 18, the disable logic "1" signal at input 57 will maintain a logic "0" signal at output 59 of NOR gate 36 irrespective of the occurrence of pulses at input 35. Following the predetermined period of time after the pressure in conduit 18 drops below the predetermined magnitude, an enable logic "0" signal appears at input 57 and the NOR gate 36 functions to respond to the alternator generated pulses 8 to provide corresponding pulses 9 at output 59 which are 180° out of phase with the input pulses 8.

A pulse modifying circuit 60 responds to the series of pulses 9 at output 59 to provide a corresponding series of pulses 10 at an output 61 having the same frequency but with a constant uniform pulse width. The modifier 60 includes an inverting NOR gate 62 having a pair of inputs 63 mutually connected to the output 59 through a timing capacitor 64 and also connected to the system common 39 through a parallel connected circuit 65 including a diode 66 and a resistor 67. The capacitor 64 and resistor 67 function to provide a delay in the operation of the NOR gate 62 to provide uniform width pulses 10 at output 61.

An integrator 68 includes a parallel connected circuit including a resistor 69 and a capacitor 70 which are connected between the positive voltage lead 42 and an output connecting circuit 71. The integrator 68 further includes a connecting resistor 72 and a diode 73 which are serially connected between the output 61 of NOR 62 and the output circuit 71.

With a disable logic "1" signal at input 57 of NOR 36, the output 61 of NOR 62 will remain at a logic "1" voltage level to reverse bias the diode 73. The capacitor 70 remains fully charged to a pre-established level. With an enable logic "0" signal at input 57 of gate 36, the speed responsive pulses 8 at input 35 generate pulses 9 of the same frequency at output 59 which are modified by the modifying circuit 60 to provide corresponding pulses 10 at output 61 having the same frequency as the pulses 8 at input 35 but with a constant magnitude pulse width. Each negative going pulse 10 at output 61 is negatively integrated by integrator 68 to correspondingly decrease the D.C. voltage at output circuit 71. In such manner, higher frequency pulses 10 will cause integrator 68 to provide a lower potential D.C. voltage signal at output 71 while lower frequency pulses will provide a higher D.C. voltage level at output 71.

For example, the circuits could be established so that the operation of engine 12 below 1900 RPM will cause the voltage at output circuit 71 to remain at or above a predetermined magnitude, such as 4 volts D.C. for example. With the engine 12 operating at or above 1900 RPM with a sensed low fuel pressure condition existing, the voltage at connecting circuit 71 will drop below the predetermined level, such as below 4 volts D.C. for example, and will be sufficient to turn on an oscillator 74 to provide reoccurring intermittent output gating pulses at the circuit 32.

The oscillator 74 includes a pair of NOR circuits 75 and 76 interconnected to oscillate under certain controlled conditions. The NOR circuit 75 has an input 77 connected to the connecting circuit 71 and an input 78 connected to an output 79 of NOR 76. An output 80 of NOR 75 is connected to both inputs 81 of NOR 76 through a series connecting circuit including a resistor 82 and a capacitor 83 joined at a junction 84. A feedback circuit 85 includes a resistor 86 connected to the output 79 of NOR circuit 76 and to the junction circuit 84. The junction circuit 84 is also connected to the connecting circuit 71 of integrator 68 through a noise filtering capacitor 87. With the voltage at input 77 at or above the predetermined magnitude, the oscillator 74 will be in an non-oscillatory state and no gating signals will appear at the output 32. When the voltage at input 77 drops below the predetermined magnitude, the oscillator will oscillate at a frequency determined by the time constant of resistor 86 and capacitor 83 to provide a series of gating pulses through an output resistor 88 to the connecting circuit 32 to cyclically operate the alarm 31.

The alarm 31 includes a buzzer 89, which could also constitute a light or other suitable signaling apparatus, having one lead 90 connected to a positive potential battery terminal 91 and another lead 92 connected to an anode circuit of a silicon control rectifier (SCR) 93. A gate circuit 94 of SCR 93 is connected to the connecting circuit 32 while a cathode circuit is connected to the system common 39 and to a negative potential battery terminal 95. A battery 96 is connected to terminals 91 and 95 so that a positive output 97 of battery 96 is connected to terminal 91 while a negative output 98 is connected to the terminal 95.

The series of cyclic gating pulses supplied through connecting circuit 32 from oscillator 74 will cyclically gate the SCR 93 so as to repetitively energize buzzer 89 to provide a cyclical sound occurring at a certain frequency, such as 2 Hz for example. Such signal provided by buzzer 89 indicates that a sensed low pressure condition has existed for a predetermined period of time at the output of fuel pump 14 and the engine 12 is operating at or above a predetermined speed which might cause an overheated condition at the operating piston 21 and combustion chamber 20.

An improper inverse polarity connection of battery 96 to terminals 91 and 95 will cause conduction through a Zener diode 99 to continually energize the buzzer 89 until the improper battery connection is removed.

FIG. 3 illustrates an alternative embodiment of a timing circuit wherein identical components as discussed above will be designated with identical numbers primed. The pressure switch 26' includes normally open contacts 100 which close in response to the fuel pressure in conduit 18 dropping below the predetermined magnitude. The connecting circuit 28' is connected to the potential source lead 42' through a resistor 101 and is also connected to the gate input 57' through a serially connected resistor 102 and a parallel connected circuit 103 including a diode 104 and a resistor 105. A capacitor 106 is connected between the gate input 57' and the circuit common 39'. With switch 100 in an open condition in response to normal pressure conditions in conduit 18, the capacitor 106 remains fully charged to maintain a disable signal at the gate input 57'. The closure of switch 100, however, allows the capacitor 106 to discharge through the closed switch 100 to provide an enable signal to the gate input 57′.

The low fuel pressure monitor provides a desirable warning in response to the continued existence of a low fuel pressure condition while operating at high engine speeds.

What is claimed is:

1. A low fuel pressure monitor for a two cycle engine having an operating piston initially cooled by pressurized fuel, comprising
    a speed sensor connected to sense the operating speed of said engine,
    a pressure sensor connected to sense the fuel pressure supplied to said engine,
    a connecting circuit connected to an engine driven alternator provided by said speed sensor to provide a series of pulses having a frequency proportional to engine speed,
    a timing circuit to operate from a first condition providing a disable signal to a second condition providing an enable signal in response to a decrease in fuel pressure for a predetermined period of time,
    an integrator connected through a gate circuit to operatively respond to said enable signal and said frequency proportional pulses to provide a varying D.C. output proportional to the frequency of said pulses, and
    an oscillator connected to said integrator to operate from a non-oscillating condition to an oscillating condition in response to a predetermined D.C. output indicative of a decrease in fuel pressure and an operating speed above a predetermined magnitude to operatively provide a signal indicating a condition where said operating piston may become over-heated in response to a decrease in fuel pressure and an operating speed above a predetermined magnitude.

2. A low fuel pressure monitor within a power system including a fuel pump to operatively conduct fuel under pressure from a fuel tank to a combustion chamber of a two cycle internal combustion engine in response to the sensed pressure within a crank case of the engine to initially cool an operating piston within the chamber by the pressurized fuel and to subsequently supply operating power to the piston when ignited, said monitor comprising
    a fuel pressure sensor connected to the power system to operate from a first pressure condition to a second pressure condition in response to the fuel pressure being below a predetermined magnitude,
    a timing circuit connected to said fuel pressure sensor to provide a disable signal in response to said first pressure condition and an enable signal following a predetermined time after the transfer to said second pressure condition,
    a speed sensor connected to said power system to provide a first series of pulses having a frequency relating to a speed characteristic of said power system,
    a gate circuit having a first input connected to said timing circuit and a second input connected to said speed sensor and an output to provide a second series of pulses only in response to said enable signal,
    a pulse modifier connected to said gate circuit output to modify said second pulses to provide a third series of pulses having uniform pulse-width and a frequency relating to a speed characteristic of said power system,
    an integrator to integrate said third pulses to provide a high speed output representing the speed characteristic being above a predetermined magnitude and a low speed output representing the speed characteristic being below a predetermined magnitude,
    an oscillator connected to said integrator and transferrable between a deactivated condition in response to said low speed output and an oscillatory condition providing a series of gating pulses in response to said high speed output,
    an alarm including a gatable switch connected to said oscillator to provide an intermittent signal in response to said series of gating pulses to indicate a continued low fuel pressure condition while operating at a high speed characteristic.

3. The monitor of claim 2, wherein said gatable switch of said alarm includes a controlled rectifier having a gate circuit connected to said oscillator and an anode circuit connected to a positive battery terminal through a buzzer and a cathode circuit connected to a negative battery terminal, and a Zener diode connected across said anode and cathode circuits to continually energize said buzzer in response to an improper reverse polarity connection of a battery to said positive and negative terminals.

* * * * *